United States Patent
Gupta et al.

(10) Patent No.: US 11,812,265 B1
(45) Date of Patent: Nov. 7, 2023

(54) CERTIFICATE-BASED AUTHENTICATION FOR RADIO-BASED NETWORKS

(71) Applicant: Amazon Technologies, Inc., Seattle, WA (US)

(72) Inventors: Diwakar Gupta, Seattle, WA (US); Kaixiang Hu, Fremont, CA (US); Benjamin Wojtowicz, San Francisco, CA (US); Upendra Bhalchandra Shevade, Washington, DC (US); Shane Ashley Hall, Kirkland, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 60 days.

(21) Appl. No.: 17/526,789

(22) Filed: Nov. 15, 2021

(51) Int. Cl.
*H04W 12/069* (2021.01)
*H04W 12/0471* (2021.01)
*H04W 12/041* (2021.01)
*H04W 12/082* (2021.01)

(52) U.S. Cl.
CPC ....... *H04W 12/069* (2021.01); *H04W 12/041* (2021.01); *H04W 12/0471* (2021.01); *H04W 12/082* (2021.01)

(58) Field of Classification Search
CPC ............. H04W 12/069; H04W 12/041; H04W 12/0471; H04W 12/082; H04L 63/04; H04L 63/0428; H04L 63/061; H04L 9/083; H04L 9/321
See application file for complete search history.

(56) References Cited

U.S. PATENT DOCUMENTS

| | | | | |
|---|---|---|---|---|
| 9,825,937 B2* | 11/2017 | Ahmavaara | ......... | H04W 12/041 |
| 2014/0215207 A1* | 7/2014 | Datta | .................. | H04L 63/0823 |
| | | | | 713/158 |
| 2017/0295255 A1* | 10/2017 | Horn | ................... | H04L 63/0272 |
| 2018/0205722 A1* | 7/2018 | Getschmann | ....... | H04L 63/0876 |
| 2020/0351653 A1* | 11/2020 | Khan | .................... | H04W 12/35 |
| 2021/0329434 A1* | 10/2021 | Ramakrishnan | .... | H04L 63/0272 |
| 2021/0360401 A1* | 11/2021 | Marinho | ............. | H04L 63/0823 |
| 2022/0132315 A1* | 4/2022 | Kolekar | ................ | H04L 63/205 |
| 2023/0007483 A1* | 1/2023 | Mueck | ................ | H04W 12/069 |

* cited by examiner

*Primary Examiner* — Mohammad W Reza
(74) *Attorney, Agent, or Firm* — Perilla Knox & Hildebrandt LLP; Thomas B. Hildebrandt

(57) ABSTRACT

Disclosed are various embodiments for certificate-based authentication in radio-based networks. In one embodiment, a request for service from a radio-based network is received from a client device. The request for service includes a secure certificate. The radio-based network includes a radio access network and an associated core network. The authenticity of the secure certificate is validated based at least in part on a certificate signature in the secure certificate signed by a certificate authority. It is determined that an entity identified in the secure certificate is permitted to access the radio-based network. Radio-based network access is provided to the client device in response to determining that the entity is permitted to access the radio-based network.

20 Claims, 11 Drawing Sheets

CERTIFICATE-BASED AUTHENTICATION FOR RADIO-BASED NETWORKS

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
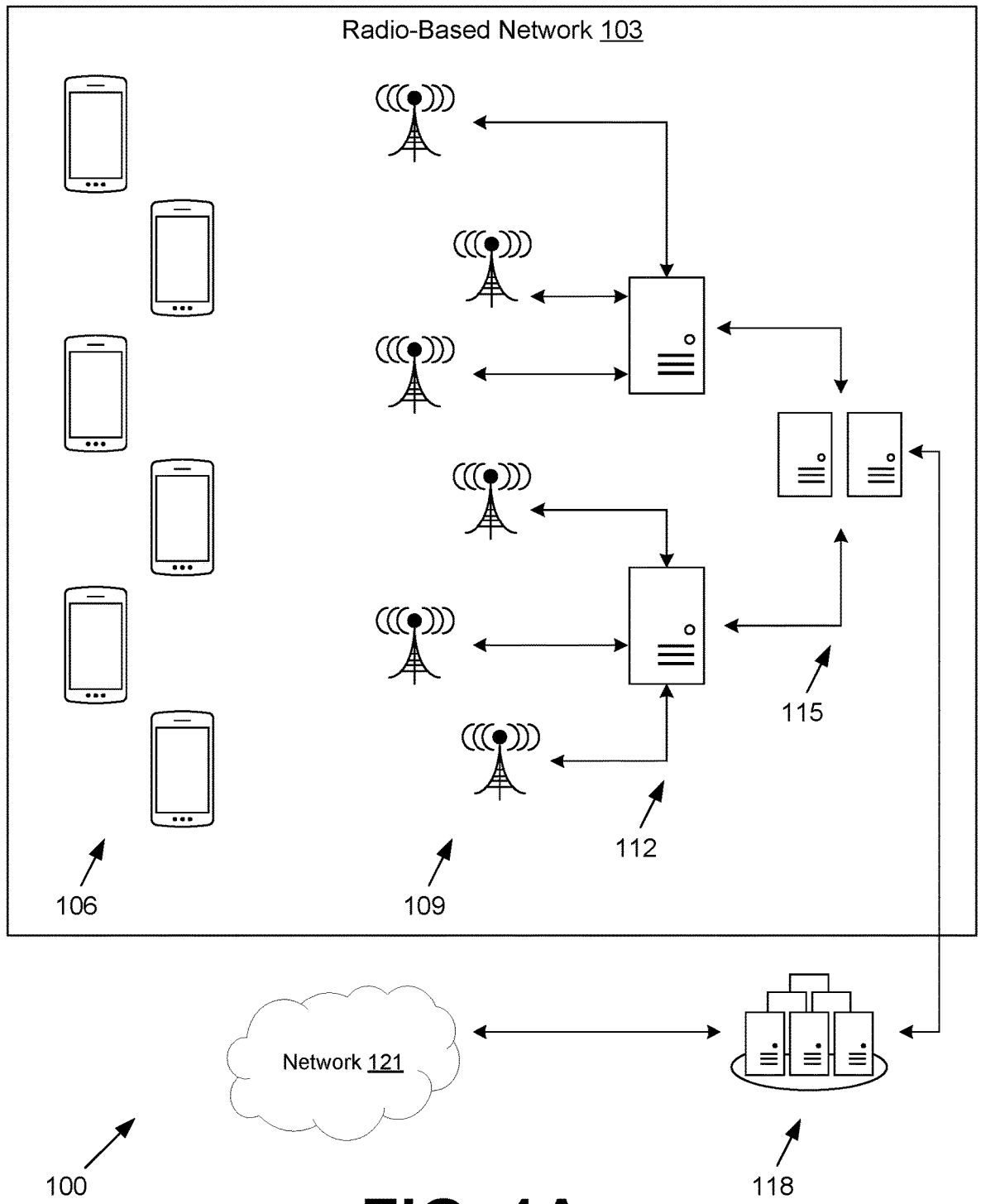
FIG. 1A is a drawing of an example of a communication network that deployed and managed according to various embodiments of the present disclosure.

The present disclosure relates to certificate-based authentication in radio-based networks, such as 4G, LTE, 5G, and sixth-generation (6G) radio-based networks implemented at least partly by using cloud provider network infrastructure. A radio-based network can include a radio access network (RAN) and an associated core network. The radio-based networks may be deployed on behalf of a customer using the cloud provider network infrastructure in at least a partially automated way. The customer may correspond to an organization or enterprise with numerous users and user equipment that receive service from the radio-based networks. In some scenarios, the customer's radio-based network may be a private network, limited to usage by the customer's devices. In other scenarios, the customer's radio-based network may be open to external users.

A radio-based network is typically secured by physical subscriber identity modules (SIMs) that are present in each of the user equipment (UE) that connects to the radio-based network. The SIMs store identifiers that are used to uniquely identify a UE for authentication purposes as well as one or more cryptographic keys that facilitate secure, encrypted communication between the UE and the radio-based network. For example, a SIM stores a primary key that is pre-shared with the radio-based network, and the primary key is used to generate session keys that are actually used to encrypt network traffic between the UE and the radio-based network. With embedded SIMs (eSIMs) or software-based SIMs, the primary key may change.

Various embodiments of the present disclosure use customer-created secure certificates in place of SIMs or eSIMs to perform registration and authentication functions in a radio-based network. Secure certificates, also known as digital certificates, public key certificates, or identity certificates, are used to prove the ownership of a public key. A secure certificate may include identifying information about the key, information about the owner, and a digital signature of a certificate authority that has verified the contents of the certificate. For example, a secure certificate may be in the X.509 format. As will be described, a customer, such as an organization, may generate unique secure certificates for each of its UEs on its radio-based network using a certificate authority. Such a certificate authority may be specific to the customer or may be operated by a cloud service provider that also operates at least a portion of the radio-based network on its cloud provider network infrastructure.

In some embodiments, the device-specific secure certificates are used alongside existing SIM or eSIM authentication systems in order to provide full access to a radio-based network. In such embodiments, the pre-shared key of the SIM or eSIM may grant the UE limited access to the radio-based network, such as in a "walled garden" experience. The UE can then present a secure certificate to an authentication management service, which upon validation of the secure certificate, will grant unrestricted access to the radio-based network.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage and advanced Quality of Service (QoS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency and reliability.

The disclosed radio-based network service can give enterprises the best of both worlds—the performance, coverage and QoS of a Telco-grade cellular network, with ease and cost of deployment and operation associated with Wi-Fi. The disclosed service can provide suitable hardware in different form factors that enterprises can deploy to their sites, and comes integrated with software that runs the entire network, from small cell sites to the internet break-outs. Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks.

The disclosed service supports multiple deployment scenarios. In a cloud only deployment, the service can provide small radio cells that an enterprise customer can place on site, while the network functions and other network software are run in the closest (or one of several closest) cloud provider availability zones or edge locations. For enterprises that want an on-premise deployment, the disclosed service provides cloud-provider hardware such as the substrate extensions described herein. In this mode, the network and applications remain on premises for the enterprise, enabling the enterprise to securely store and process data that needs to remain local (e.g., for regulatory compliance, security concerns, etc.). Further, the disclosed service can allow any compute and storage that is not being used for run the radio-based network to be used to run any local workloads via the same APIs that customers can use to run workloads in traditional cloud provider regions. Beneficially, because of this enterprises do not have to worry about being over-scaled and wasting capacity, because the service will enable any excess capacity to be used for local processing and will provision new hardware and software as the needs of the network change. Further, the disclosed service can provide application development APIs that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customer can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure provide approaches that allow customers to order and deploy a radio-based network and an associated core network in an automated way. The customers may include enterprises and organizations that wish to set up a radio-based network for internal uses (e.g., a private 5G network). Through various user interfaces, a customer may specify its network plan or requirements (for example, physical site layout and device/application types and quantities), and the various components necessary to implement a radio-based network for the customer may be automatically determined and provisioned. Hardware, such as antennas, radios, and computer servers, may be preconfigured for the customer's radio-based network and shipped to the customer. The process of installing the preconfigured hardware is largely plug-and-play, and the radio-based network can be activated through a user interface or API. In addition to deploying a radio-based network, such as all or a portion of a new radio access network, various embodiments of the present disclosure may facilitate modification and management of the radio-based network, including the deployment of preconfigured equipment for additional cells, and the assignment of QoS constraints for particular devices or applications on their radio-based network.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. In some cases, the hardware sent to the customer include sufficient capacity to run both programs for operation and management of the radio-based network as well as other workloads of the customer (e.g., their applications), such that any capacity not used for the radio-based network can be accessible to run workloads under a utility computing model. Beneficially, the customer's radio-based network can scale up into this excess capacity as needed, for example, allowing the hardware usage requirements of the radio-based network to increase even before new physical hardware is provisioned to the customer. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) improving the user experience by allowing organizations to deploy their own radio-based networks in a largely automated, plug-and-play way; (2) improving flexibility in computer systems by allowing computing hardware previously dedicated to network functions in radio-based networks and associated core networks to be repurposed for other applications; (3) improving flexibility in computer systems by allowing computing hardware previously dedicated to a first radio-based network to be repurposed automatically for a second radio-based network (or to be repurposed between RAN and core network functions of the same radio-based network on an as-needed basis); (4) improving the user experience in deploying a radio-based network by preconfiguring antennas, radios, and other hardware, thereby providing a plug-and-play installation experience; (5) improving the performance of radio-based networks by optimizing deployment of cells and spectrum utilization; (6) improving the performance and management of radio-based networks by monitoring performance metrics and adding, removing, and reconfiguring cells as needed to maintain acceptable performance; (7) improving the scalability and overall performance of a radio-based network by transferring network functions previously provided by proprietary hardware to virtual machine instances operated by a cloud computing provider with elasticity under a utility computing model; (8) reducing latency in a radio-based network by transferring network functions to virtual machine instances executed on computing devices of a cloud service provider at a cell site; (9) improving security of the radio-based network by configuring network function workloads to remain on a customer's premises; (10) improving security of the radio-based network by allowing for the use of secure certificates in place or in addition to SIM or eSIM-based authentication and registration; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrates the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all the hardware, software and network functions, required to build a network. In some embodiments, the network functions may be developed and managed by the cloud service provider; however, the described control plane can manage network functions across a range of providers so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that deployed and managed according to various embodiments of the present disclosure. The communication network 100 includes a radio-based network 103, which may correspond to a cellular network such as a fourth-generation (4G) Long-Term Evolution (LTE) network, a fifth-generation (5G) network, a 4G-5G hybrid core with both 4G and 5G RANs, or another network that provides wireless network access. The radio-based network 103 may be operated by a cloud service provider for an enterprise, a non-profit, a school system, a governmental entity or other organization. Although referred to as a private network, the radio-based network 103 may use private network addresses or public network addresses in various embodiments.

Various deployments of radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as user equipment (UE) or customer premises equipment (CPE).

The radio-based network 103 can include a radio access network (RAN) that provides the wireless network access to the plurality of wireless devices 106 through a plurality of cells 109. Each of the cells 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks.

Figure 1B:
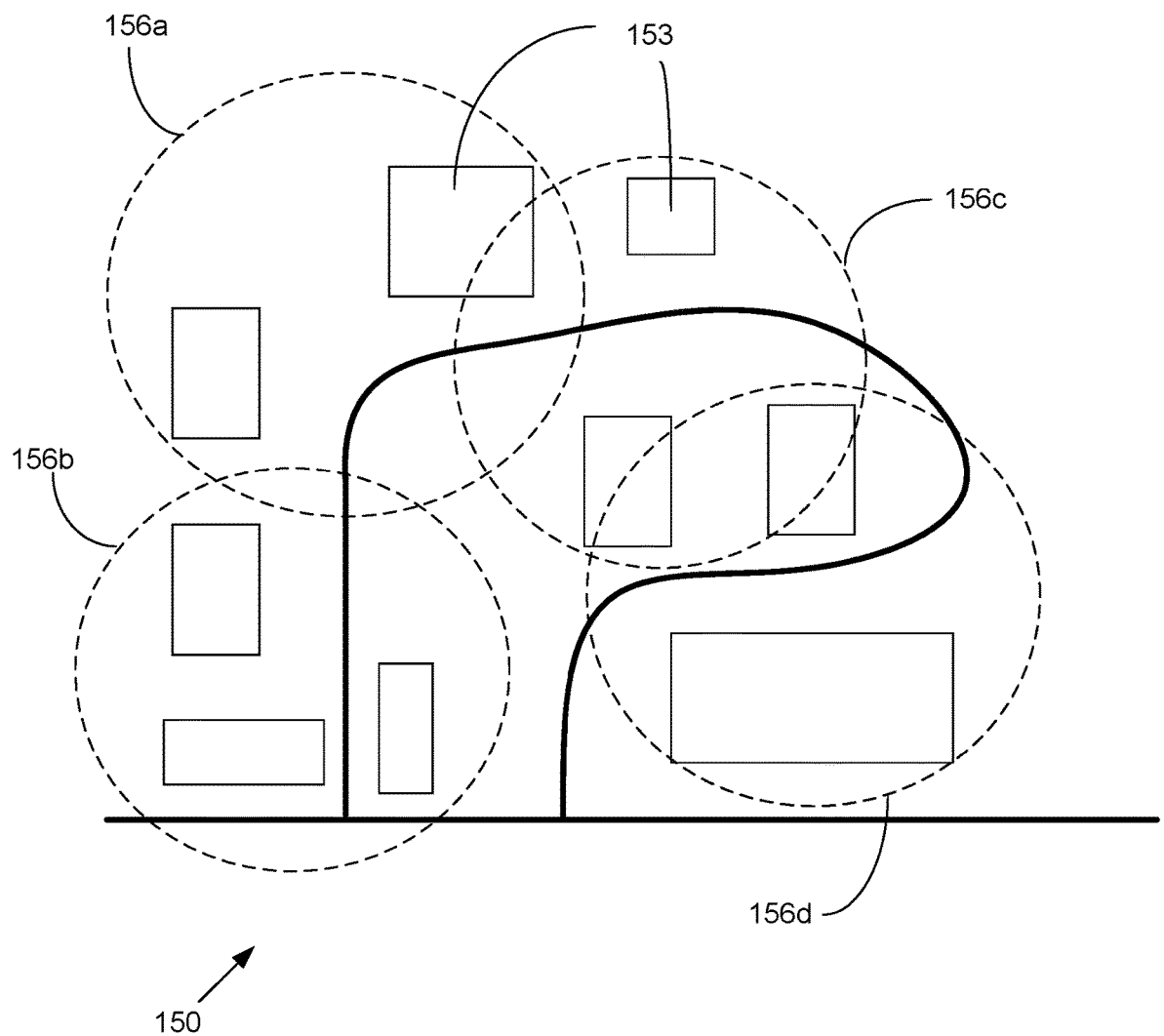
FIG. 1B is an example of a radio-based network used on an organizational campus with a plurality of buildings and deployed in accordance with various embodiments of the present disclosure.

Moving on to FIG. 1B, shown is an example of a radio-based network 150 used on an organizational campus (such as the premises of an enterprise such as a business, school, or other organization) with a plurality of buildings 153 and deployed in accordance with various embodiments of the present disclosure. Although FIG. 1B depicts an example with multiple buildings, it will be appreciated that the disclosed techniques can similarly be applied to any layout of a site, which may include one or more buildings and/or one or more outdoor spaces (such as stadiums or other outdoor venues).

The radio-based network 150 in this non-limiting example includes four cells 156a, 156b, 156c, and 156d to fully cover the organizational campus. The cells 156 may overlap somewhat in order to provide exhaustive coverage within each of the buildings 153. The adjacent or overlapping cells 156 are configured to operate with non-interfering frequencies. For example, cell 156a may use Frequency A, cell 156b may use Frequency B, and cell 156c may use Frequency C, which are all distinct frequencies as the coverage of the respective cells 156a, 156b, and 156c overlap. However, cell 156d may use, for example, Frequency A or B as the coverage of cell 156d does not overlap cell 156a or 156b.

It is noted that depending on usage or other network metrics, cells 156 may be added or removed from the radio-based network 150. In some cases, signal strength to cells 156 may be increased to reduce the number of cells 156, or lowered to increase the number of cells 156 while allowing for spectrum reuse among the cells 156. Additionally, computing capacity may be added within the geographic area of the organizational campus or within a cloud provider network in order to decrease latency, maintain security, and increase reliability, for the radio-based network 150 as desired. In some cases, computing capacity for software that implements the radio-based network 150 may be provisioned mostly or wholly in a cloud provider network and not on a customer's premises, such as in a regional data center of a cloud service provider. This software may implement various network functions such as the UPF, AMF, SMF, and so forth, that may correspond to the core network functions, central unit network functions, and distributed unit network functions. Some network functions, such as distributed unit network functions, may remain at the cell site.

Figure 1C:
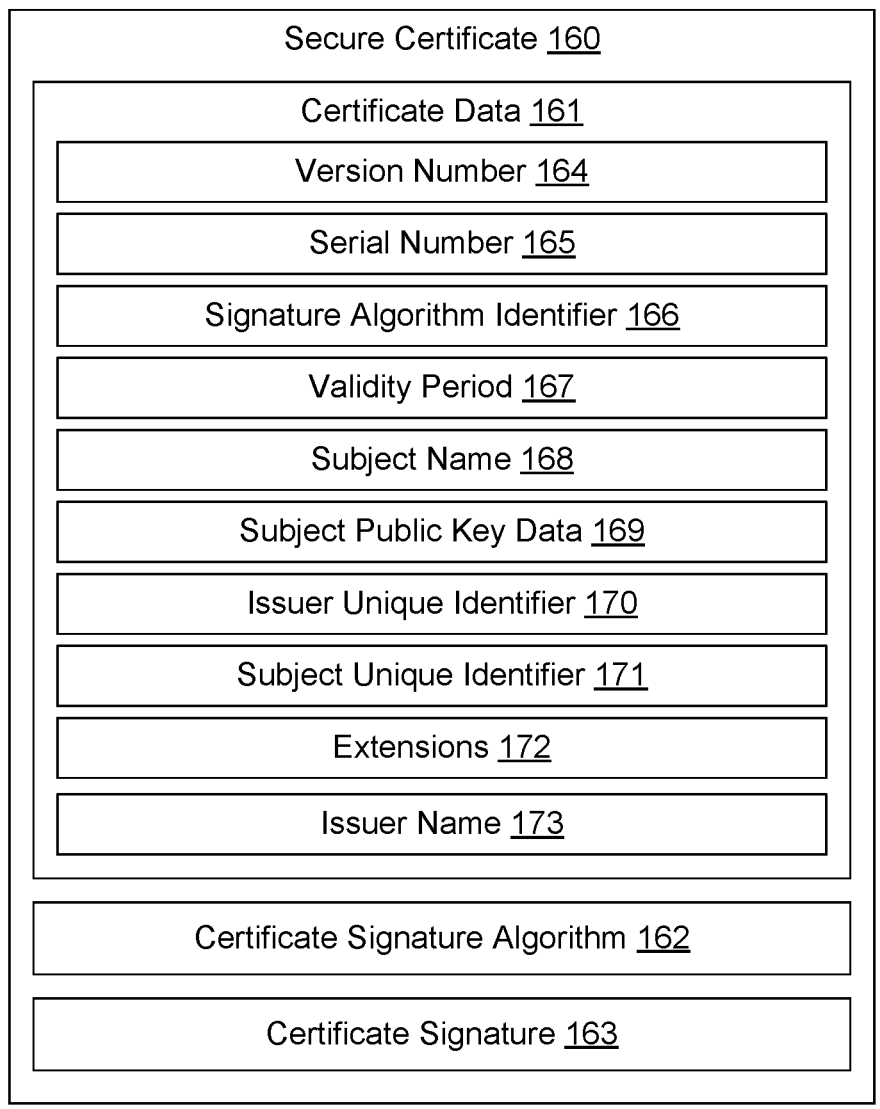
FIG. 1C is an example of a secure certificate that may be used in the radio-based network of FIG. 1A according to some embodiments of the present disclosure.

FIG. 1C is an example of a secure certificate 160 that may be used in the radio-based network 103 (FIG. 1A) according to some embodiments of the present disclosure. For example, the secure certificate 160 may use an X.509 certificate format. The secure certificate 160 may include certificate data 161, a certificate signature algorithm 162, a certificate signature 163, and/or other data. The certificate signature 163 is a digital signature generated by a certificate authority to confirm validity and integrity of the secure certificate 160, and the certificate signature algorithm 162 identifies the algorithm used to generate the certificate signature 163. The certificate data 161 may include a version number 164, a serial number 165, a signature algorithm identifier 166, a validity period 167, a subject name 168, subject public key data 169, an issuer unique identifier 170, a subject unique identifier 171, one or more extensions 172, an issuer name 173, and/or other data.

The version number 164 may correspond to a version of the certificate type. The serial number 165 may correspond to a positive integer assigned by the certificate authority to the secure certificate 160. The signature algorithm identifier 166 may comprise an object identifier that specifies the algorithm used by the certificate authority to sign the secure certificate 160. For example, the algorithms may correspond to Rivest-Shamir-Adleman (RSA) algorithms, elliptic curve cryptography (ECC) algorithms, digital signature algorithms (DSA), and so on.

The validity period 167 may define a time interval during which the secure certificate 160 is valid. The subject name 168 may specify a distinguished name of the entity associated with the public key contained in the certificate, such as the organization for which the radio-based network 103 is operated, a user name for a wireless device 106 (FIG. 1A), a name for the wireless device 106, or other names. In some embodiments, the subject name 168 may correspond to or be derived at least partially from an identifier in a subscriber identity module (SIM) or embedded SIM (eSIM), such as the international mobile subscriber identity (IMSI), a temporary mobile subscriber identity (TMSI), the integrated circuit card identifier (ICCID), or another identifier. The subject public key data 169 may include an algorithm identifier and a public key. The private key corresponding to the public key is kept private to the wireless device 106.

The issuer name 173 may specify a distinguished name of the entity issuing the certificate (e.g., the organization for which the radio-based network 103 is operated, or the cloud provider operating the cloud provider network on which at least a portion of the radio-based network 103 is operated). The issuer unique identifier 170 may be used to make the issuer name 173 unambiguous when reused by different entities over time. The subject unique identifier 171 may be used to make the subject name 168 unambiguous when reused by different entities over time. The extensions 172 may include, for example, certificate policies, constraints, distribution points of certificate revocation lists, and so on.

Figure 2A:
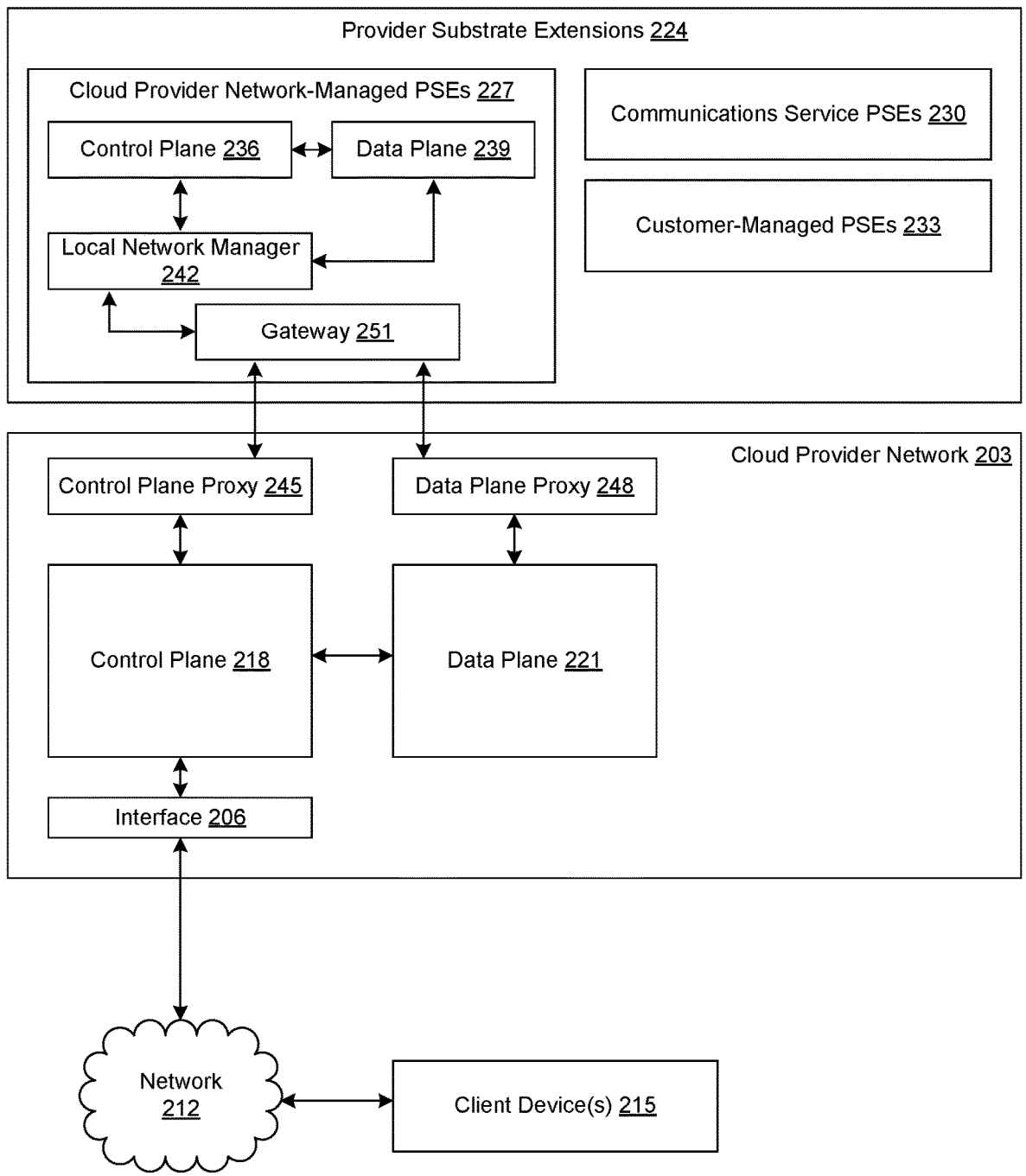
FIG. 2A illustrates an example of a networked environment including a cloud provider network and further including various provider substrate extensions of the cloud provider network, which may be used in various locations within the communication network of FIG. 1A, according to some embodiments of the present disclosure.

FIG. 2A illustrates an example of a networked environment 200 including a cloud provider network 203 and further including various provider substrate extensions of the cloud provider network, which may be used in combination with on-premise customer deployments within the communication network 100 of FIG. 1A, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a cloud provider-managed facility separate from those associated with the cloud provider network 203), communications service provider substrate extensions 230 (e.g., formed by servers associated with communications service provider facilities), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be pre-configured, e.g., by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies so an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension 224 includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane 239 extension of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension will remain in the cloud provider network 203 in order to allow customers to use as much resource capacity of the provider substrate extension as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer —which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension (as well as resources located in the cloud provider network 203, if desired). The compute instances set up on a server at a provider substrate extension 224 may communicate both with electronic devices located in the same network, as well as with other resources that are set up in the cloud provider network 203, as desired. A local gateway 251 can be implemented to provide network connectivity between a provider substrate extension 224 and a network associated with the extension (e.g., a communications service provider network in the example of a communications service provider substrate extension 230).

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1A, the distributed computing devices 112 (FIG. 1A), the centralized computing devices 115 (FIG. 1A), and the core computing devices 118 (FIG. 1A) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network 100 associated with respective customers. For example, when two communication networks 100 of respective customers share or route traffic through a common point, a provider substrate extension 224 can be connected to both networks. For example, each customer can assign some portion of its network address space to the provider substrate extension, and the provider substrate extension can include a router or gateway that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension to a destination on one of the networks can be similarly encapsulated to have the appropriate VLAN tag, source IP address (e.g., from the pool allocated to the provider substrate extension from the destination network address space) and destination IP address.

Figure 2B:
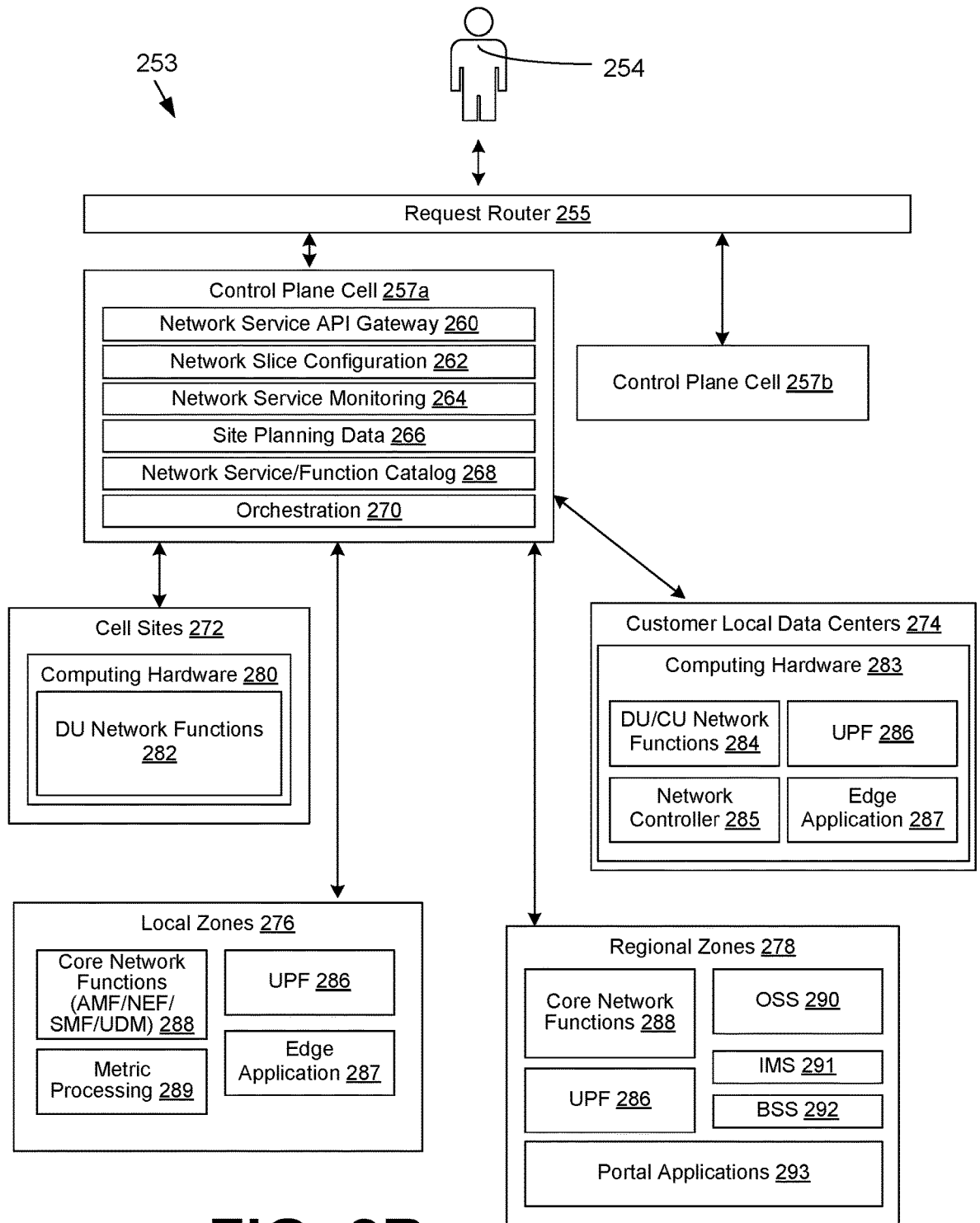
FIG. 2B depicts an example of cellularization and geographic distribution of the communication network of FIG. 1A.

FIG. 2B depicts an example 253 of cellularization and geographic distribution of the communication network 100 (FIG. 1A) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a network function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function for orchestration 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103.

The control plane cell 257 may be in communication with one or more cell sites 272, one or more customer local data centers 274, one or more local zones 276, and one or more regional zones 278. The cell sites 272 include computing hardware 280 that executes one or more distributed unit (DU) network functions 282. The customer local data centers 274 include computing hardware 283 that execute one or more DU or central unit (CU) network functions 284, a network controller, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3:
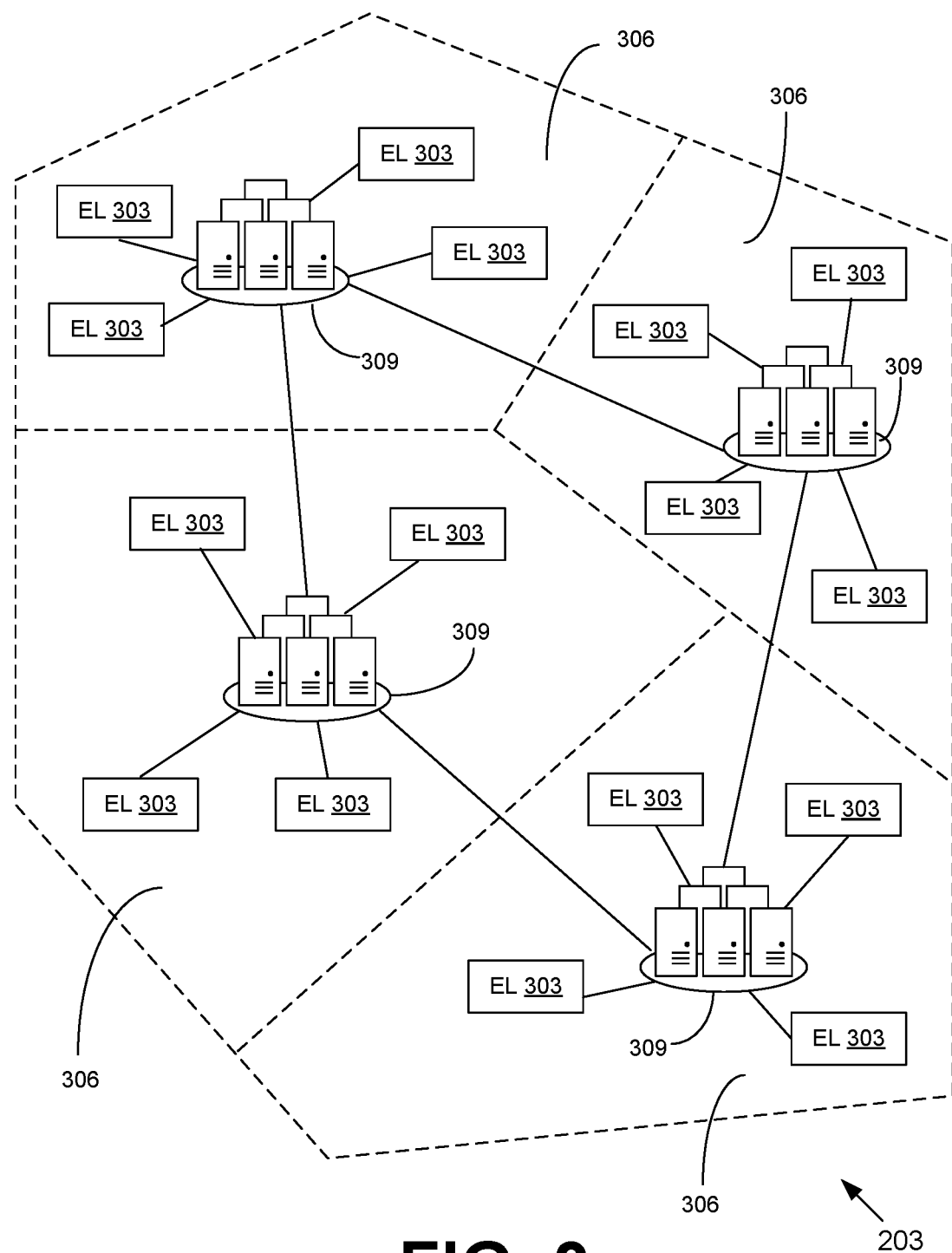
FIG. 3 illustrates an example of the networked environment of FIG. 2A including geographically dispersed provider substrate extensions according to some embodiments of the present disclosure.

FIG. 3 illustrates an exemplary cloud provider network 203 including geographically dispersed provider substrate extensions 224 (FIG. 2A) (or "edge locations 303") according to some embodiments. As illustrated, a cloud provider network 203 can be formed as a number of regions 306, where a region is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one another such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a communication service provider network). Transit Centers (TC) are the primary backbone locations linking customers to the cloud provider network and may be co-located at other network provider facilities (e.g., Internet service providers, telecommunications providers). Each region can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers to provide additional redundancy. Note that although edge locations 303 are typically depicted herein as within a communication service provider network or a radio-based network 103 (FIG. 1A), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network 100 in one country within that country, the edge locations 303 deployed within that communication network 100 can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network 100 has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 4:
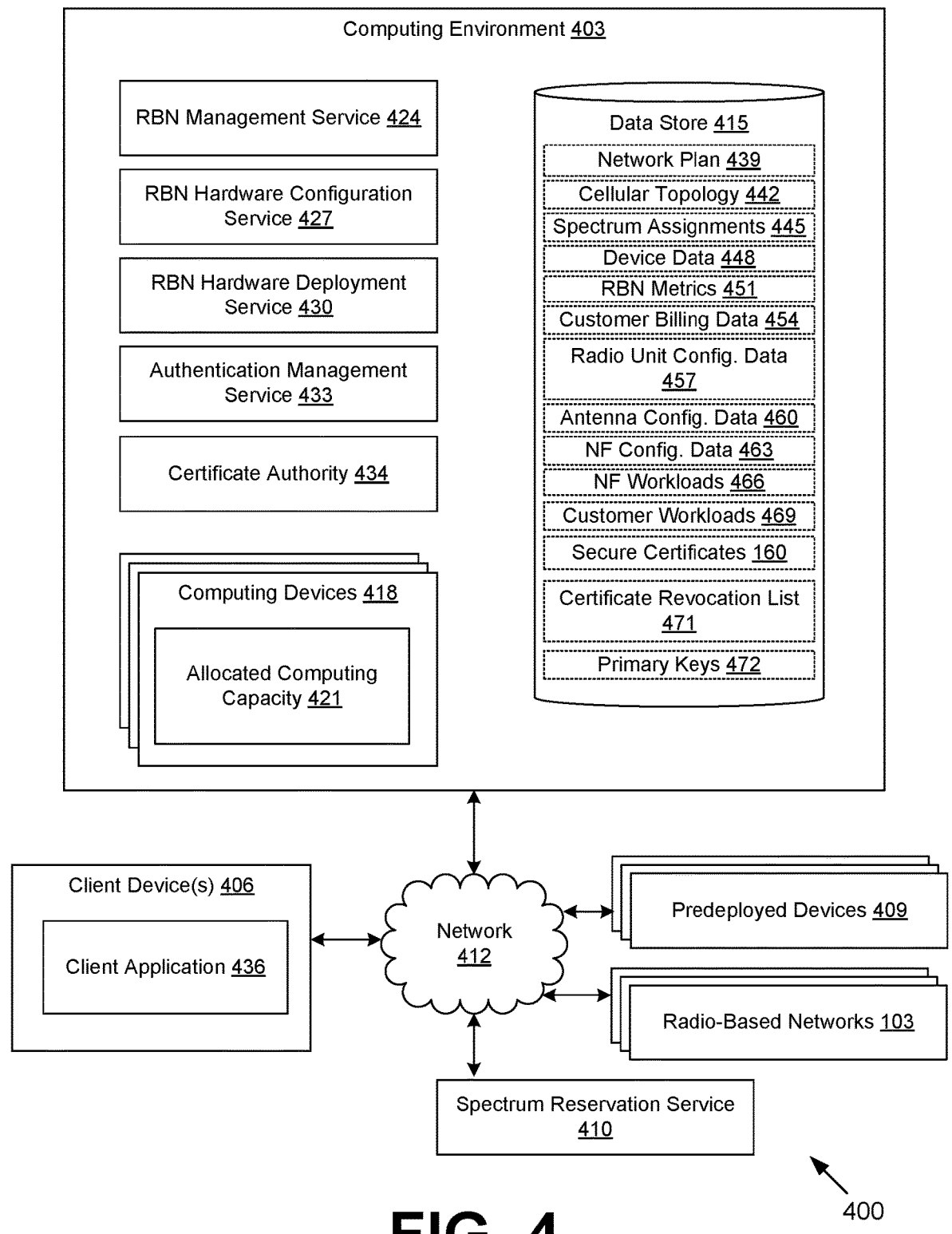
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more predeployed devices 409, a spectrum reservation service 410, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203 (FIG. 2A), where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing devices 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include a radio-based network (RBN) management service 424, a RBN hardware configuration service 427, a RBN hardware deployment service 430, an authentication management service 433, a certificate authority 434, and other applications, services, processes, systems, engines, or functionality not discussed in detail herein.

The RBN management service 424 is executed to manage, configure, and monitor radio-based networks 103 that are operated by a cloud service provider on behalf of customers. To this end, the RBN management service 424 may generate a number of user interfaces that allow customers to place orders for new radio-based networks 103, scale up or scale down existing radio-based networks 103, modify the operation of existing radio-based networks 103, configure wireless devices 106 (FIG. 1A) that are permitted to use the radio-based networks 103, provide statistics and metrics regarding the operation of radio-based networks 103, reserve frequency spectrum for customer's private networks via a spectrum reservation service 410, and so on. For example, the RBN management service 424 may generate one or more network pages, such as web pages, that include the user interfaces. Also, the RBN management service 424 may support this functionality by way of an API that may be called by a client application 436. In addition to facilitating interaction with users, the RBN management service 424 also implements orchestration of deployments and configuration changes for the radio-based networks 103 and on-going monitoring of performance parameters. In some cases, the RBN management service 424 may generate a network plan 439 for a customer based at least in part in a specification of the customer's location, an automated site survey by an unmanned aerial vehicle, and/or other input parameters.

The RBN hardware configuration service 427 is executed to implement configuration changes on hardware that implements a radio-based network 103. This may include radio units, antennas, VM instances or containers that perform network functions, routers, switches, fiber termination equipment, and so on. For example, antennas may be configured for operation at specific frequencies. Radio units may be programmed to operate at specific frequencies, join a particular radio-based network 103, and backhaul traffic to a particular VM instance or container.

In some scenarios, the RBN hardware configuration service 427 is executed to reconfigure hardware already present in a radio-based network 103. In other scenarios, the RBN hardware configuration service 427 is executed to preconfigure hardware set to be deployed to existing or new radio-based networks 103. To this end, the RBN hardware configuration service 427 may implement configurations on one or more predeployed devices 409 that are temporarily connected to the network 412 to facilitate preconfiguration before the predeployed devices 409 are shipped to the customer for deployment in the radio-based networks 103.

The RBN hardware deployment service 430 is executed to automate and arrange deployment of hardware to implement a radio-based network 103. Based on a network plan 439 submitted by or generated for a customer, the RBN hardware deployment service 430 may arrange procurement for the hardware components necessary to implement a radio-based network 103 according to the network plan 439. This may involve placing orders for new equipment automatically from vendors, reserving equipment already within inventory of the provider, or reallocating equipment already present at the customer's site or sites of other customers, where the equipment to be reallocated is no longer utilized. In this regard, the RBN hardware deployment service 430 may send a directive to customers to return equipment that is no longer utilized, where the equipment may be sent directly to other customers for use in another deployment. In another scenario, the RBN hardware deployment service 430 may send a directive to a customer to move a piece of equipment from one site where the equipment is no longer used to another site where the equipment will be used. The RBN hardware deployment service 430 may manage connection of equipment to the network 412 for preconfiguration as a predeployed device 409. The RBN hardware deployment service 430 may also arrange shipping of equipment to customer locations, including potentially a plurality of locations of the customer corresponding to respective cell sites.

The authentication management service 433 is executed to facilitate certificate-based authentication for a radio-based network 103. To this end, organizational administrative users may interact with interfaces of the authentication management service 433 to generate secure certificates 160 for wireless devices 106, to revoke secure certificates 160 for wireless devices 106, to alter permissions granted to wireless devices 106 associated with secure certificates 160, and so on. In addition, the authentication management service 433 may perform authentication, registration, and/or encryption functions for the radio-based network 103.

The certificate authority 434 is configured to generate secure certificates 160 for wireless devices 106, which includes generating a certificate signature 163 (FIG. 1C) attesting to the validity and integrity of the secure certificates 160. In one example, the certificate authority 434 may be operated by a cloud provider that also operates a portion of the radio-based network 103 on behalf of an organization. In another example, the certificate authority 434 may be operated by the organization for which the radio-based network 103 is operated.

The data stored in the data store 415 includes, for example, one or more network plans 439, one or more cellular topologies 442, one or more spectrum assignments 445, device data 448, one or more RBN metrics 451, customer billing data 454, radio unit configuration data 457, antenna configuration data 460, network function configuration data 463, one or more network function workloads 466, one or more customer workloads 469, one or more secure certificates 160, one or more certificate revocation lists 471, one or more primary keys 472, and potentially other data.

The network plan 439 is a specification of a radio-based network 103 to be deployed for a customer. For example, a network plan 439 may include premises, locations, or geographic areas to be covered, a number of cells, device identification information and permissions, a desired maximum network latency, a desired bandwidth or network throughput for one or more classes of devices, one or more quality of service parameters for applications or services, and/or other parameters that can be used to create a radio-based network 103. A customer may manually specify one or more of these parameters via a user interface. One or more of the parameters may be prepopulated as default parameters. In some cases, a network plan 439 may be generated for a customer based at least in part on automated site surveys using unmanned aerial vehicles. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc. In some cases, the network plan 439 may incorporate thresholds and reference parameters determined at least in part on an automated probe of an existing private network of a customer.

The cellular topology 442 includes an arrangement of a plurality of cells for a customer that takes into account reuse of frequency spectrum where possible given the location of the cells. The cellular topology 442 may be automatically generated given a site survey. In some cases, the number of cells in the cellular topology 442 may be automatically determined based on a desired geographic area to be covered, availability of backhaul connectivity at various sites, signal propagation, available frequency spectrum, and/or on other parameters. For radio-based networks 103, the cellular topology 442 may be developed to cover one or more buildings in an organizational campus, one or more schools in a school district, one or more buildings in a university or university system, and other areas.

The spectrum assignments 445 include frequency spectrum that is available to be allocated for radio-based networks 103 as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing wireless devices 106 that are permitted to connect to the radio-based network 103. This device data 448 includes corresponding users, account information, billing information, data plan, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on.

The RBN metrics 451 include various metrics or statistics that indicate the performance or health of the radio-based network 103. Such RBN metrics 451 may include bandwidth metrics, dropped packet metrics, signal strength metrics, latency metrics, and so on. The RBN metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The radio unit configuration data 457 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based network 103.

In various embodiments, the network functions may be deployed in VM instances or containers located in computing devices 418 that are at cell sites, at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions.

The customer workloads 469 correspond to machine images, containers, or functions of the customer that may be executed alongside or in place of the network function workloads 466 in the allocated computing capacity 421. For example, the customer workloads 469 may provide or support a customer application or service. In various examples, the customer workloads 469 relate to factory automation, autonomous robotics, augmented reality, virtual reality, design, surveillance, and so on.

The secure certificates 160 are those certificates that correspond to wireless devices 106 or users that are to be granted access to the radio-based network 103. The secure certificates 160 may be used for registration and authentication purposes as well as encryption as will be described. In some cases, the data store 415 may store portions of data from a secure certificate 160 rather than the entirety of the secure certificate 160, such as the serial number 165 (FIG. 1C), the subject name 168 (FIG. 1C), and/or the subject unique identifier 171 (FIG. 1C).

The certificate revocation list 471 may comprise a list of secure certificates 160 that have been revoked and are no longer valid. For example, the secure certificates 160 may correspond to wireless devices 106 that are no longer in use or users that are no longer associated with the organization. In some cases, the secure certificates 160 are replaced or rotated with new secure certificates 160 periodically to enhance security. In one implementation, the certificate revocation list 471 identifies the revoked secure certificates 160 by serial number 165, the subject name 168, and/or the subject unique identifier 171.

The primary keys 472 may correspond to pre-shared keys that are used to derive session keys for encrypting and maintaining the integrity of the communication between the wireless devices 106 and the radio-based network 103. The primary keys 472 may be generated in advance or uploaded by a customer and may correspond to keys already included in physical SIM cards. Alternatively, the primary keys 472 may be generated dynamically and provisioned to eSIMs. The primary keys 472 may be encrypted at rest using a customer-specified key, and the primary keys 472 may be stored in a customer-specific data store that is separate from the data of other customers of the cloud provider network 203. For example, the customer-specific data store may correspond to a machine instance operated by the customer either in the cloud provider network 203 or external to the cloud provider network 203. Alternatively, the customer-specific data store may correspond to a customer-specific account with a data storage service. The customer-specific data store may be integrated with the radio-based network 103 by way of an application programming interface (API) and one or more credentials that enable the radio-based network 103 to access the customer-specific data store.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum reservation service 410 provides reservations of frequency spectrum for customers' private networks. In one scenario, the spectrum reservation service 410 is operated by an entity, such as a third party, to manage reservations and coexistence in publicly accessible spectrum. One example of such spectrum may be the Citizens Broadband Radio Service (CBRS). In another scenario, the spectrum reservation service 410 is operated by a telecommunications service provider in order to sell or sublicense portions of spectrum owned or licensed by the provider.

Figure 5:
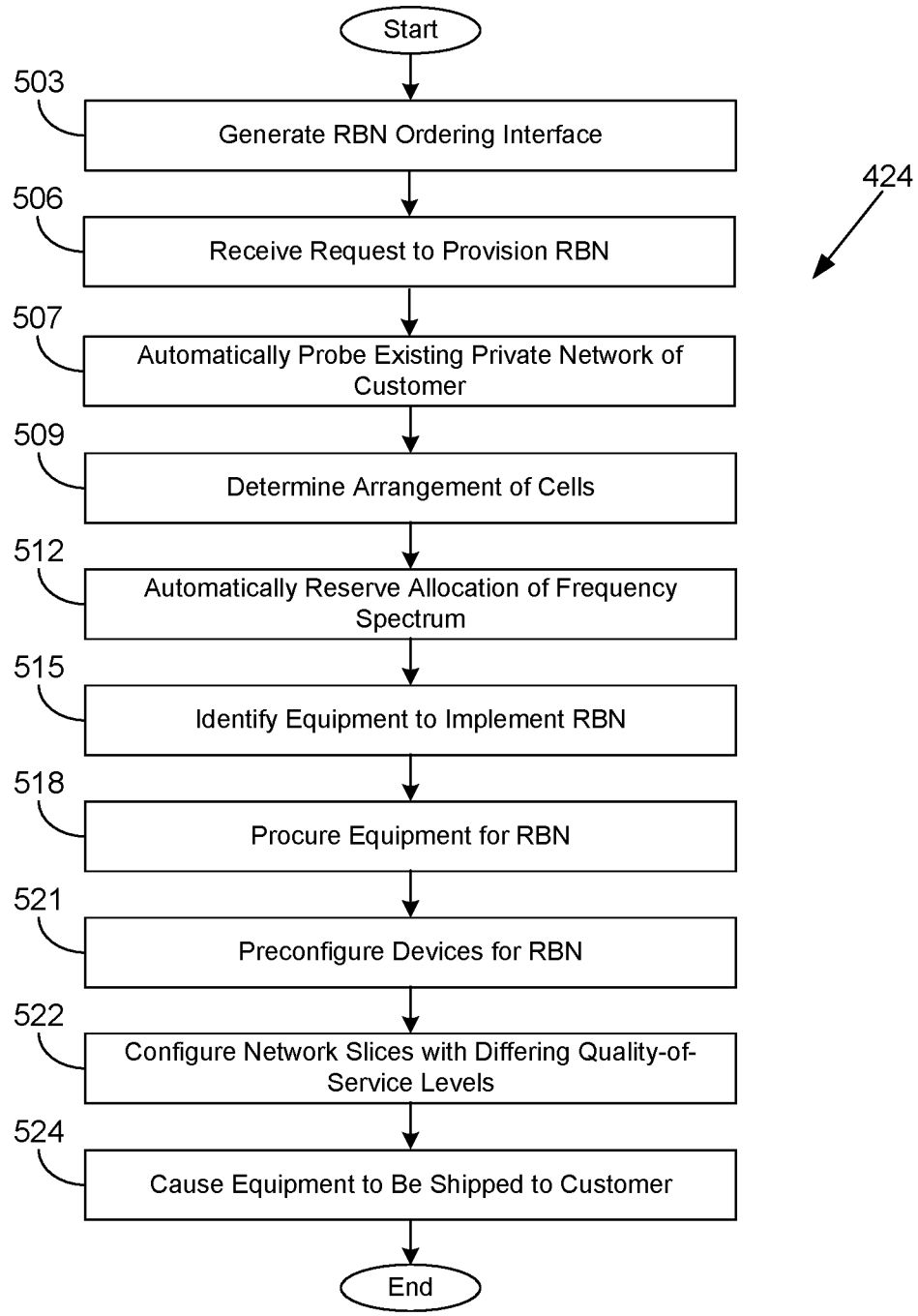
FIGS. 5-7 are flowcharts illustrating examples of functionality implemented as portions of a radio-based network management service or an authentication management service executed in a computing environment in the networked environment of FIG. 4 according to various embodiments of the present disclosure.

Referring next to FIG. 5, shown is a flowchart that provides one example of the operation of a portion of the RBN management service 424 according to various embodiments. It is understood that the flowchart of FIG. 5 provides merely an example of the many different types of functional arrangements that may be employed to implement the operation of the portion of the RBN management service 424 as described herein. As an alternative, the flowchart of FIG. 5 may be viewed as depicting an example of elements of a method implemented in the computing environment 403 (FIG. 4) according to one or more embodiments.

Beginning with box 503, the RBN management service 424 generates a user interface for ordering or provisioning an RBN 103 (FIG. 1A). For example, the user interface may include components for specifying a network plan 439 (FIG. 4) or parameters for a network plan 439. Such parameters may include, for example, a number of cells, a map or site plan of the customer's premises or geographic area to be covered, a target bandwidth, information about wireless devices 106 (FIG. 1A) or users, a target minimum latency, a desired cost, and/or other parameters. The user interface may include components for uploading one or more data files that include this information. The user interface may be sent as a network page or other network data over the network 412 (FIG. 4) for rendering by a client application 436 (FIG. 4) executed in a client device 406 (FIG. 4).

Alternatively, a client application 436 may make one or more API calls in order to place an order for or to provision an RBN from a provider.

In box 506, the RBN management service 424 receives a request to provision an RBN from an organization. For example, a user may submit a form or otherwise interact with a user interface to cause a request to be submitted. Alternatively, the client application 436 may make one or more API calls in order to request to provision the RBN.

In box 507, the RBN management service 424 may automatically initiate a probe of an existing private network of the organization. For example, organizations may have an existing network, such as a wired, ethernet network, a Wi-Fi network, or another type of network. Upon receiving appropriate security credentials and access to an endpoint on the network, the RBN management service 424 may automatically probe the network to ascertain customer requirements for a new RBN 103 and the associated core network. For example, the RBN management service 424 may automatically determine a quantity of user devices on the existing network, network bandwidth and request volume associated with various applications or services, existing latency observed for accessing the various applications or services, reliability of existing systems, and so forth. These observations may be used to set initial thresholds for latency, bandwidth, etc., in the RBN to be deployed.

In box 509, the RBN management service 424 determines an arrangement of cells 109 (FIG. 1A) in the RBN 103. The arrangement may be determined to optimally cover one or more buildings of an organization. Both internal areas of the buildings and external areas may be covered as desired. This determination may include receiving information with respect to the coverage area, including indoor and outdoor coverage areas, the number of devices to be connected, and layout of the physical network connectivity and power sources. In this regard, the RBN management service 424 may determine a number of cells 109 from the network plan 439. Alternatively, the RBN management service 424 may automatically determine an optimal number of cells 109 based at least in part on parameters such as target latency, bandwidth, signal strength, and reliability, in view of the area and/or premises of the customer to be covered. In one embodiment, an unmanned aerial vehicle may be used in order to make a site survey of the area to be covered, potentially recording signal strengths to observe a status of a frequency spectrum to determine available frequencies. The RBN management service 424 may record the arrangement of cells 109 in the cellular topology 442 (FIG. 4). In some scenarios, the RBN management service 424 may use machine learning to determine the optimal arrangement of cells 109 by deploying various arrangements for RBNs 103 and assessing performance. Over time by observing these deployments, the RBN management service 424 can learn which arrangements perform better or worse than others and use these results to train a machine learning model.

In box 512, the RBN management service 424 automatically reserves an allocation of frequency spectrum for the RBN 103. To this end, the RBN management service 424 may automatically determine available frequencies for the cellular topology 442 from publicly available frequencies, customer-owned frequencies, and/or provider-owned frequencies. The frequency determination may take into account polarization, directionality, beam tilt, and/or other factors that may allow or interfere with frequency reuse. The RBN management service 424 may record the reservation in the spectrum assignments 445 (FIG. 4). Additionally, the RBN management service 424 may communicate with an external service via the network 412, such as the spectrum reservation service 410 (FIG. 4), that implements a reservation system for frequency spectrum, to make the reservation and/or to determine available frequencies.

In box 515, the RBN management service 424 identifies equipment necessary to implement the RBN 103. This may include antennas, radio units, computing devices to implement provider substrate extensions 224 (FIG. 2A), cables, switches, routers, fiber termination gear, and so on. In some cases, the computing devices may be included in an exterior unit to be installed outside of a customer's building. Such units may be self-contained except for power and network connections in some examples. In some scenarios, the RBN management service 424 may use machine learning to determine an optimal arrangement of equipment by deploying various arrangements for RBNs 103 and assessing performance. Over time by observing these deployments, the RBN management service 424 can learn which arrangements perform better or worse than others and use these results to train a machine learning model.

The RBN management service 424 may also determine through machine learning an optimal distribution of equipment for various customers. For example, it may make sense to run network function workloads 466 (FIG. 4) for a particular type of customer only in the data center core computing devices 118 (FIG. 1A), while for another type of customer, it may be optimal to run the network function workloads 466 at the distributed computing devices 112 (FIG. 1A) or the centralized computing devices 115 (FIG. 1A). Thus, the RBN management service 424 may determine not to deploy computing devices 112 or 115 in favor of a cloud-only deployment of core computing devices 118.

In box 518, the RBN management service 424 initiates procurement of the equipment for the RBN 103 via the RBN hardware deployment service 430 (FIG. 4). This may include reserving the equipment automatically from an existing inventory of the provider, and/or placing one or more orders for the equipment from one or more vendors.

In box 521, the RBN management service 424 causes the RBN hardware configuration service 427 (FIG. 4) to preconfigure one or more devices, such as computing devices to implement network functions, radio units, antennas, routers, etc. Such devices may be connected to the network 412 as the predeployed devices 409 (FIG. 4). The RBN hardware configuration service 427 uses the radio unit configuration data 457 (FIG. 4), the antenna configuration data 460 (FIG. 4), and the network function configuration data 463 (FIG. 4) to implement the preconfigurations.

In box 522, the RBN management service 424 may configure one or more network slices for the radio-based network 103 that may provide differentiated quality-of-service levels for different user devices, applications, or services. The quality-of-service levels may provide different latency, bandwidth/throughput, signal strength, reliability, and/or other service factors. For example, the customer may have a set of devices that require very low latency, so the RBN management service 424 may configure a network slice that provides latency under a threshold for those devices. In another example, a first quality-of-service level may be provided for a first application, and a second quality-of-service level may be provided for a second application.

In box 524, the RBN management service 424 causes the RBN hardware deployment service 430 to ship the equipment, including the preconfigured, predeployed devices 409 to the customer. In some embodiments, a secure certificate 160 (FIG. 4) for accessing the radio-based network 103 may be pre-provisioned to the equipment. Various instructions for installing the equipment may be transmitted to the customer via the client application 436. Thereafter, the operation of the portion of the RBN management service 424 ends.

Figure 6:
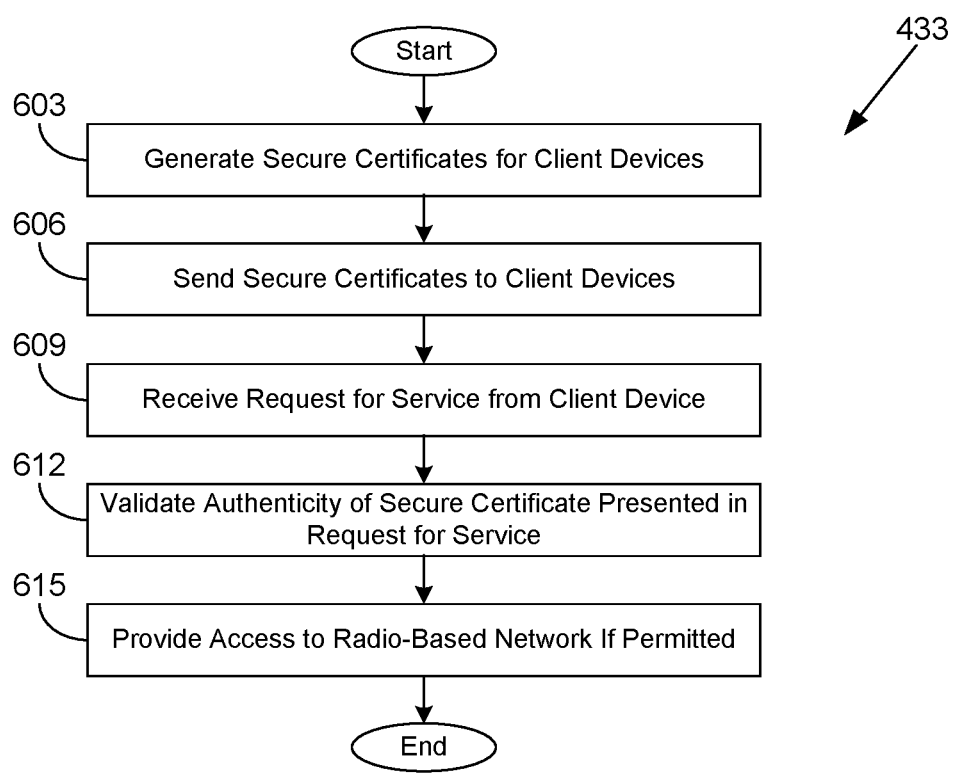

Moving on to FIG. 6, shown is a flowchart that provides one example of the operation of a portion of the authentication management service 433 according to various embodiments. It is understood that the flowchart of FIG. 6 provides merely an example of the many different types of functional arrangements that may be employed to implement the operation of the portion of the authentication management service 433 as described herein. As an alternative, the flowchart of FIG. 6 may be viewed as depicting an example of elements of a method implemented in the computing environment 403 (FIG. 4) according to one or more embodiments.

Beginning with box 603, the authentication management service 433 accesses information indicating a plurality of client devices 406 (FIG. 4) of an organization that are permitted to access a radio-based network 103 (FIG. 1A). The authentication management service 433 generates respective secure certificates 160 (FIG. 4) for each of a plurality of client devices 406 to be connected to a radio-based network 103. In this regard, the secure certificates 160 may be issued and signed by the use of a certificate authority 434 (FIG. 4) operated by a cloud provider or the organization for which the radio-based network 103 is being operated. In some embodiments, the secure certificates 160 are replaced or rotated on a periodic basis and may have a limited period of validity as defined by the validity period 167 (FIG. 1C). In some embodiments, a particular secure certificate 160 is associated with one or more security groups in a virtual private cloud network, where a client device 406 presenting the particular secure certificate 160 would have access to the computing resources of the security group(s) in the virtual private cloud network. Also, the subject name 168 (FIG. 1C) or other identifiers of the secure certificate 160 may be used to define resource access in one or more access control lists.

In some cases, the secure certificates 160 may be generated by a manufacturer of a client device 406 and embedded in the hardware of the client device 406. Such hardware secure certificates 160 may be used in place of or alongside secure certificates 160 that are dynamically or periodically generated in order to access a radio-based network 103.

In box 606, the authentication management service 433 may send the secure certificates 160 to the client devices 406. In some cases, the secure certificates 160 are transmitted to the organization operating the radio-based network 103 so that the organization can deploy the secure certificates 160 to the client devices 406. The secure certificates 160 may be unique or specific to the client devices 406 or to the respective user(s) of the client devices 406. In some cases, a client device 406 may be provisioned with multiple secure certificates 160 corresponding to different radio-based networks 103 or different virtual private cloud networks accessible through a radio-based network 103.

In box 609, the authentication management service 433 receives a request for service from the radio-based network 103 from a client device 406. In the request for service, the client device 406 includes or presents a secure certificate 160 for registration or authentication. In box 612, the authentication management service 433 may validate the authenticity of the secure certificate 160 based at least in part on validating the certificate signature 163 as being generated by the trusted certificate authority 434 or an intermediate certificate authority 434 within a chain of trust.

In addition, the authentication management service 433 may confirm that the client device 406 corresponding to the secure certificate 160 is permitted to access the radio-based network 103. The entity identified in the secure certificate 160 may uniquely correspond to the client device 406 or a user associated with the client device 406. For example, the authentication management service 433 may confirm that the serial number 165 (FIG. 1C), the subject unique identifier 171 (FIG. 1C), and/or the subject name 168 (FIG. 1C) are permitted to access the radio-based network 103. In some cases, hardware-based secure certificates 160 may be automatically granted access for all client devices 406 of a specific type or made by a specific manufacturer, potentially for the organization. The authentication management service 433 may also determine that the secure certificate 160 is not on a certificate revocation list 471 (FIG. 4). If the secure certificate 160 is identified on a certificate revocation list 471, the authentication management service 433 may fall back to other mechanisms for authentication (e.g., SIM or eSIM) or otherwise deny access to the radio-based network 103.

In box 615, the authentication management service 433 provides the client device 406 with access to the radio-based network 103 if permitted in response to validating the authenticity of the secure certificate 160. In so doing, the authentication management service 433 may use the public key of the secure certificate 160 to exchange one or more encrypted session keys with the client device 406 that the client device 406 can in turn use to encrypt outbound network traffic and/or decrypt inbound network traffic. For example, the authentication management service 433 and the client device 406 may use Extensible Authentication Protocol (EAP) Transport Layer Security (EAP-TLS) with the secure certificate 160 to encrypt network traffic. Thereafter, the operation of the portion of the authentication management service 433 ends.

Figure 7:
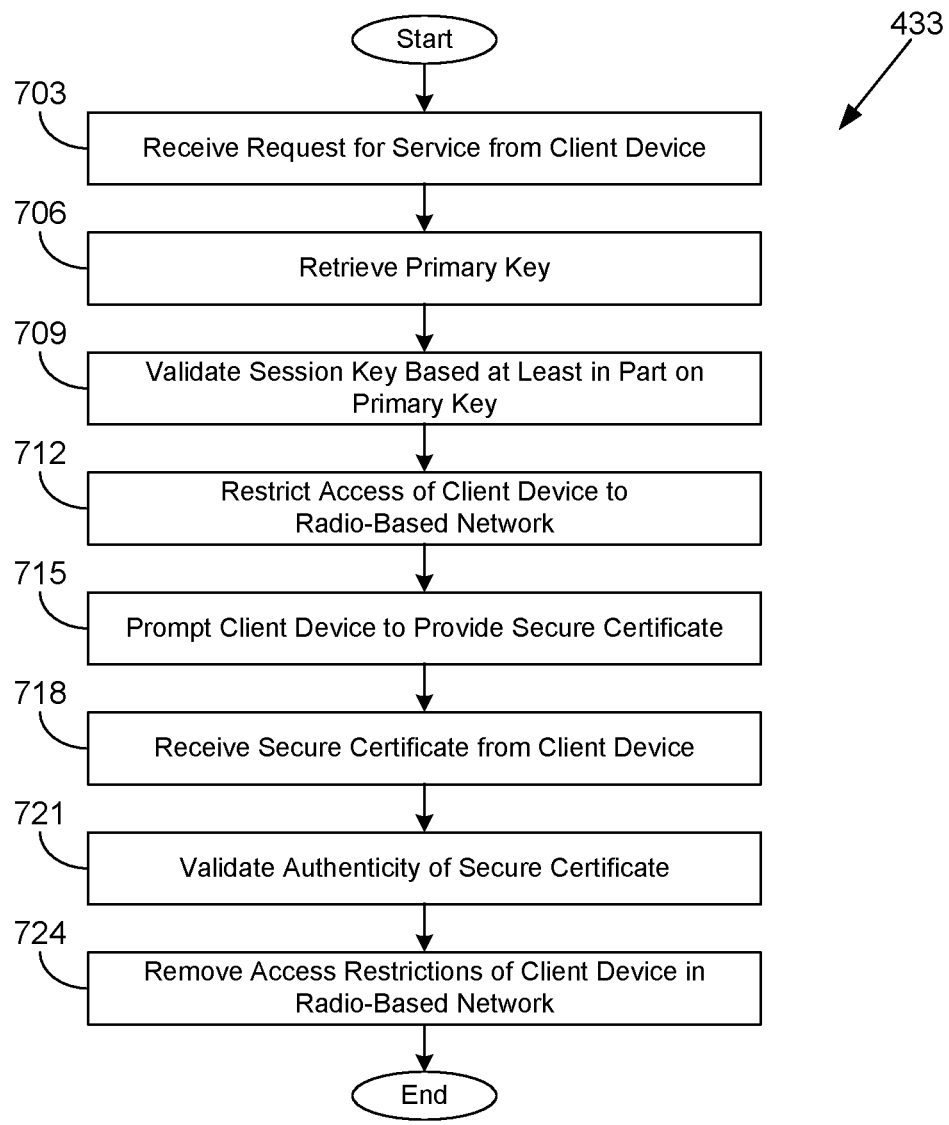

Turning now to FIG. 7, shown is a flowchart that provides one example of the operation of another portion of the authentication management service 433 according to various embodiments. It is understood that the flowchart of FIG. 7 provides merely an example of the many different types of functional arrangements that may be employed to implement the operation of the portion of the authentication management service 433 as described herein. As an alternative, the flowchart of FIG. 7 may be viewed as depicting an example of elements of a method implemented in the computing environment 403 (FIG. 4) according to one or more embodiments.

Beginning with box 703, the authentication management service 433 receives a request for service from a radio-based network 103 (FIG. 1A) operated for a customer (e.g., an organization) from a client device 406 (FIG. 4). The request may present one or more session keys derived from a primary key 472 (FIG. 4). In box 706, the authentication management service 433 retrieves the corresponding primary key 472 that maps to the client device 406 as identified by one or more identifiers in the SIM or eSIM. In so doing, the authentication management service 433 may retrieve the primary key 472 from a customer-specific data store. The primary key 472 may be encrypted at rest using a customer-specific key, and the authentication management service 433 may decrypt the primary key 472 using the customer-specific key.

In box 709, the authentication management service 433 validates the session key provided by the client device 406 based at least in part on the pre-shared primary key 472. In box 712, if certificate-based authentication is enabled, the authentication management service 433 restricts the access of the client device 406 to the radio-based network 103. For example, the authentication management service 433 may provide a "walled garden" environment, where the client device 406 can connect only to a gateway that solicits and receives a secure certificate 160 (FIG. 4).

In box 715, the authentication management service 433 may prompt the client device 406 to provide the secure certificate 160. In box 718, the authentication management service 433 receives the secure certificate 160 from the client device 406. In box 721, the authentication management service 433 validates the authenticity of the secure certificate 160 received from the client device 406 based at least in part on validating the certificate signature 163 (FIG. 1C) as being generated by the trusted certificate authority 434 (FIG. 4) or an intermediate certificate authority 434 within a chain of trust. In addition, the authentication management service 433 may confirm that the client device 406 corresponding to the secure certificate 160 is permitted to access the radio-based network 103. For example, the authentication management service 433 may confirm that the serial number 165 (FIG. 1C), the subject unique identifier 171 (FIG. 1C), and/or the subject name 168 (FIG. 1C) are permitted to access the radio-based network 103. The authentication management service 433 may also determine that the secure certificate 160 is not on a certificate revocation list 471 (FIG. 4).

In box 724, the authentication management service 433 removes access restrictions of the client device 406 in the radio-based network 103 in response to validating the secure certificate 160. Thereafter, the operation of the portion of the authentication management service 433 ends.

Figure 8:
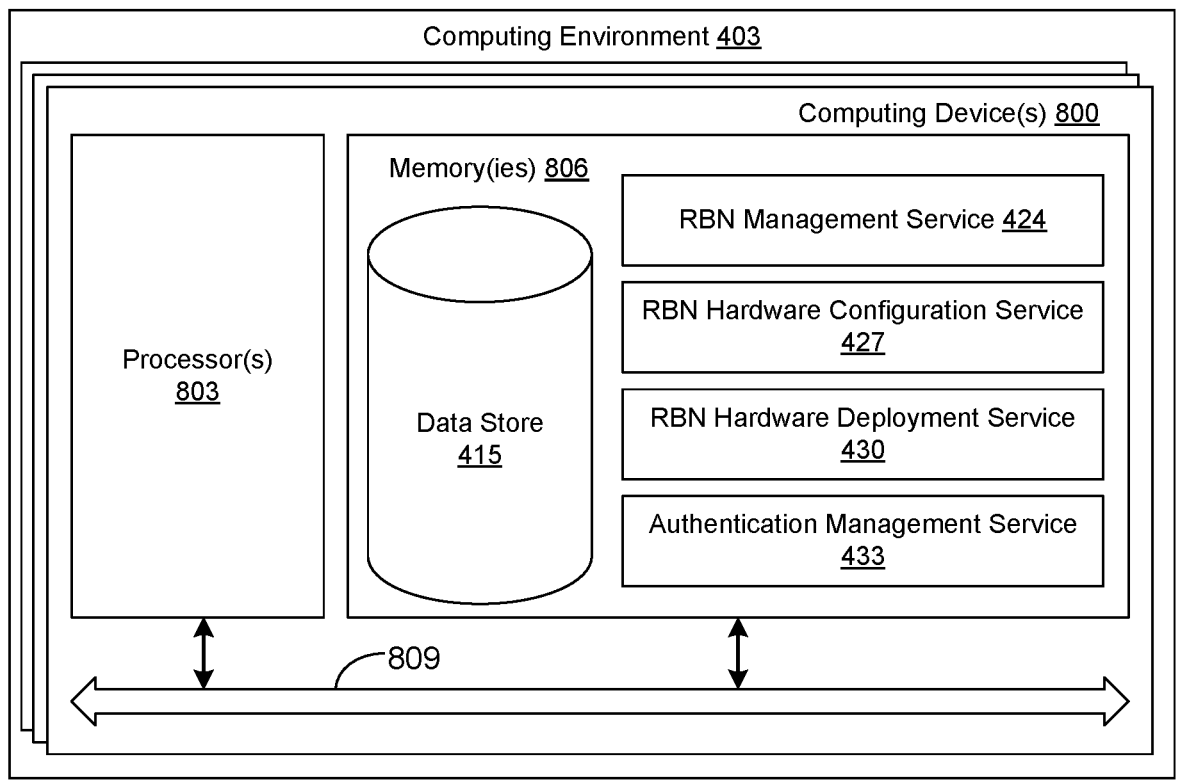
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the RBN management service 424, the RBN hardware configuration service 427, the RBN hardware deployment service 430, the authentication management service 433, and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C #, Objective C, Java®, JavaScript®, Perl, PHP, Visual Basic, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the RBN management service 424, the RBN hardware configuration service 427, the RBN hardware deployment service 430, the authentication management service 433, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-7 show the functionality and operation of an implementation of portions of the RBN management service 424 and the authentication management service 433. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the RBN management service 424, the RBN hardware configuration service 427, the RBN hardware deployment service 430, and the authentication management service 433, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the RBN management service 424, the RBN hardware configuration service 427, the RBN hardware deployment service 430, and the authentication management service 433, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a radio-based network provisioned for an organization, the radio-based network comprising a radio access network and an associated core network, at least a portion of the associated core network being provisioned in a cloud provider network; and
at least one computing device in the cloud provider network configured to at least:
  access information indicating a plurality of client devices of the organization that are permitted to access the radio-based network;
  generate and send respective secure certificates to individual ones of the plurality of client devices;
  initially authenticate a particular client device of the plurality of client devices based at least in part on a session key derived from a pre-shared primary key provisioned in an embedded subscriber identity module (eSIM) of the particular client device;
  receive a request for service from the radio-based network from the particular client device after initially authenticating the particular client device, the request for service including the respective secure certificate that was sent to the particular client device;
  validate an authenticity of the respective secure certificate based at least in part on a certificate signature in the respective secure certificate; and
  provide access to the radio-based network to the particular client device in response to determining that the respective secure certificate was issued to the particular client device.

2. The system of claim 1, wherein the at least one computing device is further configured to at least determine that the respective secure certificate is not on a certificate revocation list.

3. The system of claim 1, wherein the at least one computing device is further configured to at least encrypt network traffic between the particular client device and the radio-based network based at least in part on the respective secure certificate.

4. The system of claim 1, wherein the respective secure certificate is generated by a certificate authority specific to the radio-based network.

5. The system of claim 1, wherein the at least one computing device is further configured to at least granting the particular client device with limited access to the radio-based network in response to initially authenticating the particular client device.

6. The system of claim 5, wherein with the limited access to the radio-based network the particular client device is permitted to connect to a gateway.

7. A computer-implemented method, comprising:
initially authenticating a client device based at least in part on a session key derived from a pre-shared primary key provisioned in an embedded subscriber identity module (eSIM) of the client device;
receiving, from the client device after the client device is initially authenticated, a request for service from a radio-based network, the request for service including a secure certificate, the radio-based network including a radio access network and an associated core network;
validating authenticity of the secure certificate based at least in part on a certificate signature in the secure certificate signed by a certificate authority;
determining that an entity identified in the secure certificate is permitted to access the radio-based network; and
providing access to the radio-based network to the client device in response to determining that the entity is permitted to access the radio-based network.

8. The computer-implemented method of claim 7, wherein the entity identified in the secure certificate corresponds to an international mobile subscriber identity (IMSI) number.

9. The computer-implemented method of claim 7, wherein the secure certificate is embedded in the client device by a manufacturer of the client device.

10. The computer-implemented method of claim 7, further comprising verifying that the secure certificate is not identified in a certificate revocation list.

11. The computer-implemented method of claim 7, further comprising encrypting network traffic between the radio-based network and the client device based at least in part on a public key in the secure certificate.

12. The computer-implemented method of claim 11, wherein encrypting network traffic between the radio-based network and the client device based at least in part on the public key further comprises encrypting the network traffic using a second session key shared between the radio-based network and the client device using the public key.

13. The computer-implemented method of claim 7, wherein the entity identified in the secure certificate uniquely corresponds to a user associated with the client device.

14. The computer-implemented method of claim 7, wherein an issuer of the secure certificate corresponds to an organization on behalf of which the radio-based network is operated.

15. The computer-implemented method of claim 7, wherein an issuer of the secure certificate corresponds to a cloud provider that operates at least a portion of the radio-based network within a cloud provider network infrastructure for an organization, and the client device is associated with the organization.

16. The computer-implemented method of claim 7, wherein the request for service is received from the client device by a gateway, and the method further comprises providing the client device with access to the gateway via the radio-based network in response to initially authenticating the client device.

17. A computer-implemented method, comprising:
receiving, from a client device, a request for service from a radio-based network, the request for service including at least one session key generated from a pre-shared primary key provisioned in an embedded subscriber identity module (eSIM), the radio-based network comprising a radio access network and an associated core network;
validating the at least one session key based at least in part on the pre-shared primary key; and
restricting access of the client device to the radio-based network until the client device provides a secure certificate that is validated for unrestricted access to the radio-based network.

18. The computer-implemented method of claim 17, further comprising generating the secure certificate by a certificate authority controlled by an operator of the radio-based network.

19. The computer-implemented method of claim 17, wherein the secure certificate is specific to the client device.

20. The computer-implemented method of claim 17, further comprising:
receiving the secure certificate from the client device;
validating an authenticity of the secure certificate based at least in part on a certificate signature in the secure certificate signed by a certificate authority;
determining that an entity identified in the secure certificate is permitted to access the radio-based network; and
providing unrestricted access to the radio-based network to the client device in response to determining that the entity is permitted to access the radio-based network.

* * * * *